Figure 1:
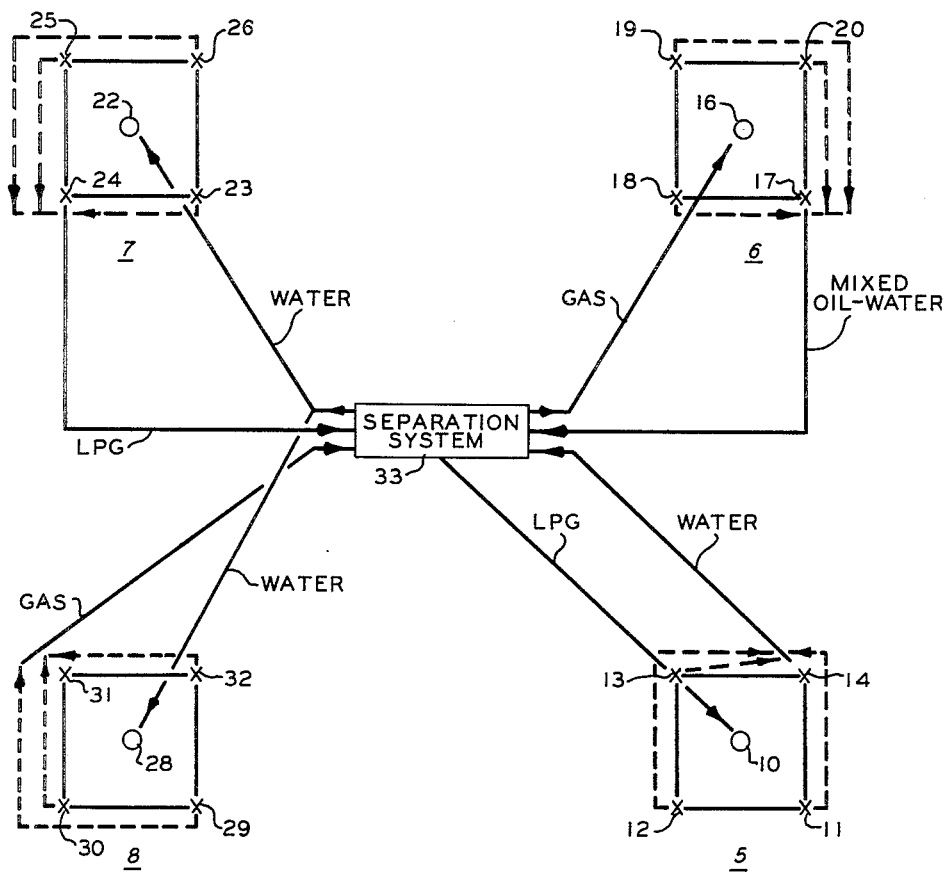

O – INPUT WELL
X – PRODUCER

INVENTOR.
R. F. WIEMER

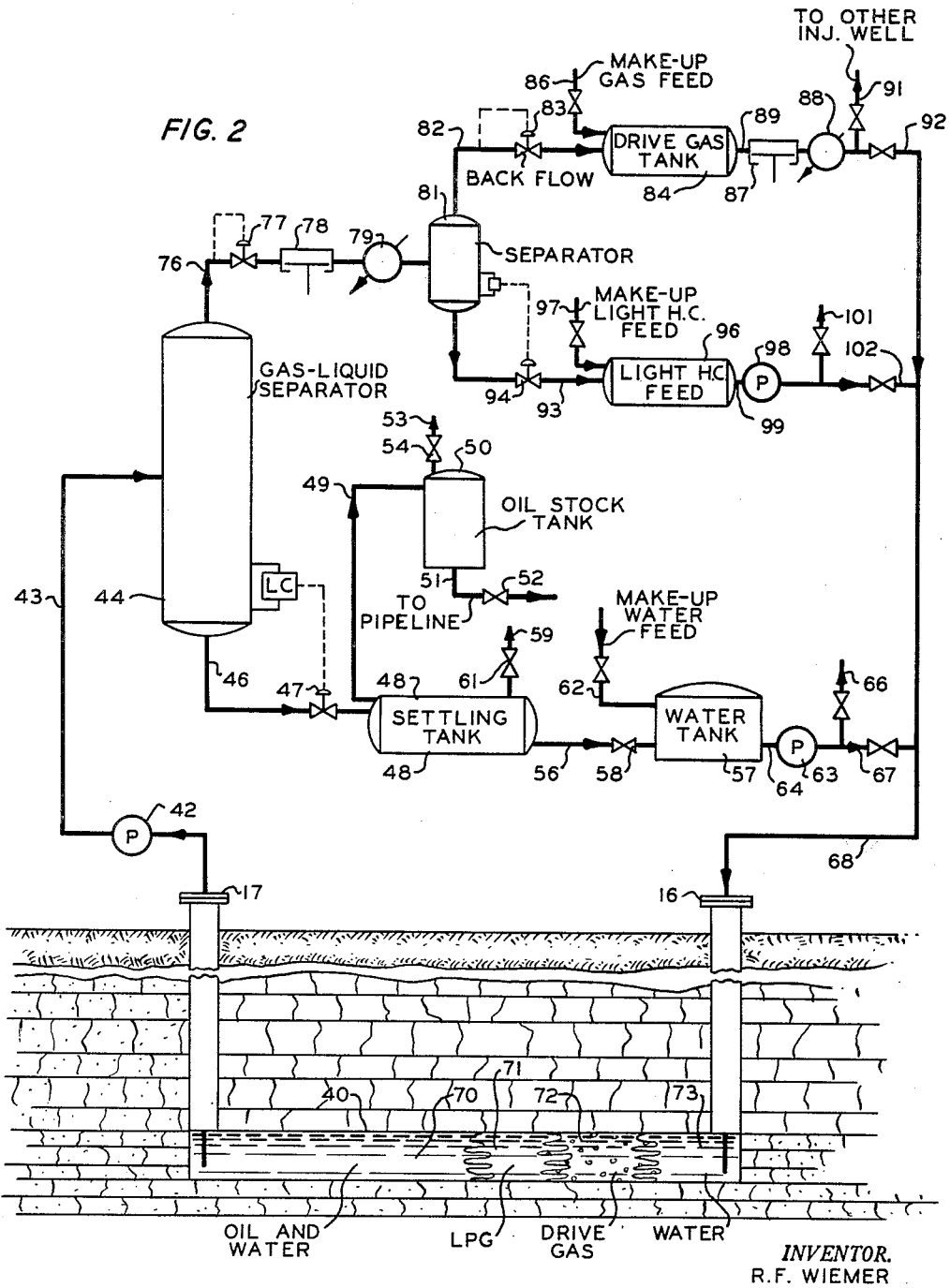

United States Patent Office 3,137,344
Patented June 16, 1964

3,137,344
MINIMIZING LOSS OF DRIVING FLUIDS
IN SECONDARY RECOVERY
Robert F. Wiemer, Bartlesville, Okla., assignor to
Phillips Petroleum Company, a corporation of
Delaware
Filed May 23, 1960, Ser. No. 30,799
5 Claims. (Cl. 166—9)

This invention relates to the production of hydrocarbons from subterranean reservoirs by employing secondary recovery techniques. In another aspect it relates to increasing the amount of oil recovered from a producing field which has undergone a water flood, by commencing a miscible-phase displacement procedure that minimizes the amount of solvent, driving gas and water required. In still another aspect, it relates to injecting driving fluids in a particular order, then producing the same, and reinjecting these fluids in other wells in the same field in a particular pattern.

During the primary recovery of oil from an underground formation, the reservoir pressure eventually drops off to a point such that it is no longer possible to produce oil at an economical rate by its natural fluid energy. It has then become the practice to employ one or more methods of secondary recovery. These practices, by and large, have consisted of injecting fluids into the formation through one or more walls of a series of regularly spaced wells, thereby providing a new driving force to displace oil from the formation toward adjacent producing wells in the same field.

These secondary techniques are of two general types, water flooding and miscible-phase displacement. In the latter method, the injection of an oil solvent, such as liquefied petroleum gas, and a driving gas, such as natural gas, to displace unrecovered oil from a formation, does have practical limitations, principally in the costs of the injected fluids, much of which goes unrecovered after injection to displace said oil in said formation.

In a straight water flooding operation, though a substantial percentage of oil is recovered thereby, this technique still leaves a significant amount of oil in the formation. This oil is usually written off as unrecoverable, as is the large quantity of water which still remains in the reservoir.

In the method of this invention, the two techniques are combined, so that a miscible phase secondary recovery operation follows a conventional water drive operation in such a manner that the miscible phase driving fluids, gas and solvent, are recovered and reused in the further operation of the secondary recovery operation in other parts of the oil field. During certain times some water may be produced from the production wells in the field, and this too may be used in the invention to reduce the water requirements of the operation. The solvent and gas are gathered, separated if necessary, reinjected in the prescribed order into a second input well or wells of another development block of wells, and then followed up with renewed water injection. Concurrently, the oil produced at the production wells of each block or series of wells, is constantly being drawn off to stock tanks.

Alternatively, instead of confining the solvent and gas injection to the same well as used in the previous water injection, alternate producing wells during the waterflood operations can now be converted into injection wells for the miscible-phase displacement stage. Any of a variety of patterns of injection and recovery may be set up, provided the order of injection of fluids, as described above, is maintained. Then again, the produced and regathered fluids are used to sweep another portion of the field through another pattern or row of wells which had previously undergone water flooding.

The result of these techniques is that when the secondary recovery operations according to this invention are completed, the reservoir will contain substantially only injected water and unrecoverable oil. By the method of this invention, the two major secondary recovery techniques are combined to minimize the expenditure of valuable solvent and driving gas, both of which must often be piped or trucked to a producing field at considerable expense for a miscible fluid recovery operation.

It is an object of this invention to provide an improved secondary recovery process for hydrocarbons in a previously water flooded underground reservoir where the miscible-phase flood system can then be employed.

It is a further object to greatly reduce the cost of injection fluids employed in a secondary recovery by regathering and reinjecting these fluids into other wells in the same field.

Further objects and advantages of this invention will become apparent to those skilled in the art from a study of the accompanying disclosure, appended claims and drawing, in which:

FIGURE 1 illustrates groups of wells composed of so-called 5-spot patterns which can be subjected to the method of this invention; and FIGURE 2 is a schematic illustrating one method of separating and transferring the produced driving fluids from one group of wells to the injection wells of other groups of wells.

Referring now to the drawing, wherein like parts have been designated by like reference numerals, and to FIGURE 1 in particular, a plurality of wells of a previously water flooded oil field, are arranged in substantially regular space rows, as shown. These wells may be grouped in conventional five-spot patterns, 5 through 8, for the purposes of carrying out the method of this invention, in conjunction with an active water flood, or in a depleted water flooded area.

Looking at the first group of wells 5, oil is being withdrawn from the producing wells thereof until the ratio of water to oil produced is uneconomical. Miscible fluid flooding is then commenced with the injection of a first driving fluid, usually an oil solvent, such as liquefied hydrocarbons of a carbon chain length of three and four atoms, into the central injection well 10 of pattern 5. Injection of liquefied petroleum gas continues until a substantial slug, for example, at least 2 percent of the calculated pore volume of the formation between central injection well 10 and the four surrounding producing wells, 11 to 14 is filled. Alternatively, the liquefied petroleum gas injection may be continued for a predetermined period of time, perhaps 30 days. In either event, a sufficient pressure should be maintained in said injection well to retain said liquefied hydrocarbons in liquid form.

Regarding a second group of wells 6, injection of liquefied petroleum gas into central injection well 16 has already been completed, and the next stage of injection of a non-condensing gas, such as carbon dioxide or natural gas, has been commenced. Injection of the non-condensing gas will continue for a period similar to that employed for injecting liquefied petroleum gas. An oil and water mixture is being produced from the group. The injected non-condensing gas will drive the previously injected liquefied hydrocarbons through the reservoir ahead of it toward the surrounding producing wells 17 to 20.

Regarding a third group of wells 7, the injection of both liquefied hydrocarbon and non-condensing gas has already been completed, and the reinjection of water into central well 22 thereof has just begun. Liquefied hydrocarbons are simultaneously being produced. The injected water will drive the non-condensing gas, and the remainder of liquefied hydrocarbon not yet produced, ahead of it through the reservoir to be produced from surrounding wells 23–26.

Turning now to the fourth group of wells 8, shown in FIGURE 1, the injection of liquefied hydrocarbon and non-condensing gas have also been completed, and the reinjection of water through central well 28 thereof has been going on for some time. Non-condensing gas is simultaneously being produced. Water injection here will continue so long as non-condensing gas can be economically produced from surrounding producing wells 29–32, and still be economically handled by the separation system.

In the phase of operation shown, as to first group of wells 5, oil, water, liquefied hydrocarbons, and non-condensing gas are withdrawn therefrom in approximately that order, with considerable mixing of the phases. The fluids, as produced, are passed to a separation and distribution system 33. The separated fluids, excluding the produced crude oil which is passed to a stock tank (not shown), are now passed to certain of the injection wells of the other groups of the field, depending upon which stage of the injection sequence that they are in. For example, producing wells 11 to 14 of group 5 are shown in FIGURE 1 as producing principally water. The produced water passes through the separation and storage system 33, and then may flow to the central injection wells of groups 7 and 8, which are concurrently undergoing water injection.

Concurrently, producing wells 17 to 20 of group 6 are producing mixed oil and water, which pass to the separation system and then to the appropriate storage or make-up tank. Meanwhile, the producing wells 23 to 26 of group 7 are producing predominantly liquefied hydrocarbon, which passes through the separation system, and from there to central injection well 10 of group 5, which is presently undergoing solvent injection. Finally, the producing wells 29 to 32 of group 8 are currently producing non-condensing gas, which after passing through the separation system, goes to the central injection well 16 of group 6 which is then undergoing gas injection.

A field undergoing secondary recovering according to this invention is not limited to the four groups of wells just described; rather as many groups, or patterns, may be employed in the method as can be conveniently handled by the particularly capacity of separation system of FIGURE 2. It is important, however, to maintain the prescribed sequence of injection of the driving fluids; namely, liquefied hydrocarbon, non-condensing gas, and water. Regardless of the number of wells which are producing, or the drive fluid being produced at a given well at a given time, the produced fluids are gathered and directed to the separation and storage system, from whence the separated fluids can be directed to the appropriate injection wells, as desired.

Referring now to the diagrammatic elevational view of FIGURE 2, showing one embodiment of the produced fluids separation and distribution system of this invention, in which crude oil, water, liquefied hydrocarbons, and non-condensing gas are produced from an oil bearing formation via producing wells, such as 17 of group 6, the pump 42 conducts produced fluid through conduit 43 to gas-liquid separator 44, which generally operates at a low pressure, for example, about 25 p.s.i.g. The mixed oil-water liquid is separated from the vaporized petroleum gas and non-condensing gas therein. The oil-water mixture passes out the bottom of separator 44, via line 46 which has a flow controller valve 47 therein that is regulated by the liquid level in the separator. The oil-water mixture enters settling tank 48, wherein produced oil is separated and is passed via line 49 to oil stock tank 50. Stock tank 50 is provided with a conduit 51, having valve 52 therein, for withdrawing accumulated oil and passing it to the pipeline, as desired. Tank 51 is further provided with an overhead outlet vent 53, having a valve 54 therein, for venting uncondensable hydrocarbon gases from said stored oil.

Settling tank 48 is provided with a line 56 for conducting the water layer to water tank 57, as desired, by opening valve 58 therein. Settling tank 48 is also provided with an overhead outlet conduit 59 for venting trapped gases therefrom, as desired, by opening valve 61.

Water tank 57 is provided with an inlet conduit 62 for introducing make-up water to said water tank to compensate for water left in the reservoir. A pump 63 is provided in the outlet conduit 64 of water tank 57 for passing water via conduits 66 or 67 to selected injection wells of the oil field. For example, water from make-up tank 57 is passing through conduits 67 and 68 to central injection well 16 of group 6. Thus, several distinct zones are formed in oil bearing formation 40, ranging from a mixed oil and water zone 70 adjacent to a producing well, such as 17, through a liquefied hydrocarbon slug 71, a non-condensing drive gas slug 72, and reinjected water 73 which is still adjacent to injection well 16.

Returning to the separation system, an overhead line 76 is provided on separator 44, and has a pressure control valve 77 therein. A compressor 78 and a cooling means 79 are provided in conduit 76, between valve 77 and another separator 81. Separator 81 operates at a relatively high pressure, perhaps on the order of 200 p.s.i.g. As the just liquefied stream enters separator 81, non-condensing gas flashes off and is carried overhead via conduit 82. Conduit 82 is also provided with a backflow control valve 83 before entering drive gas make-up tank 84. Make-up tank 84 is provided with fresh non-condensing gas feed conduit 86 for supplying make-up drive gas to compensate for that lost at various points in the secondary recovery system. Compressor 87 and cooling means 88 are provided in outlet line 89 of tank 84, for returning the drive gas to a temperature and pressure suitable for reinjection into the formation. Conduits 91 and 92 are provided to conduct the non-condensing gas to certain of the injection wells, as desired.

The underflow from separator 81 comprises liquefied hydrocarbon, usually liquefied petroleum gas, which passes via line 93, having flow controller 94 therein, to light hydrocarbon make-up tank 96. Tank 96 is provided with a light hydrocarbon inlet conduit 97 to provide make-up for that left in the formation or vented from the system. A pump 98 is provided in the outlet conduit 99 of tank 96 for pumping the oil solvent through conduits 101 or 102 to certain of the several injection wells of the field, as desired.

I claim:

1. A method of recovering oil from an oil-bearing formation having a plurality of wells arranged in substantially regular spaced rows penetrating said formation wherein water is injected into the reservoir via a first input well, said input well being disposed centrally relative to a first group of production wells, continuing the injection of water until the ratio of water to oil produced is uneconomical and there remains unswept sections of the reservoir that extend between the producing wells of said first group, thereafter shutting down said water input well, injecting a bank of a liquefiable petroleum gas into at least one well of said first group of producing wells, maintaining a pressure on said injected petroleum gas sufficient to retain the gas in liquefied form, next injecting a non-condensing gas through said one well of said first group so as to drive said liquefied petroleum gas through said formation toward the remaining producing wells of said first group, withdrawing oil, liquefied petroleum gas and non-condensing gas from said reservoir through said remaining producing wells, separating the produced fluids, reinjecting the separated liquefied petroleum gas into at least one well of a second group of wells, thereafter reinjecting separated non-condensing gas into said one well of said second group of wells, and withdrawing oil, liquefied petroleum gas, and non-condensing gas through the remaining wells of said second group of wells.

2. The method according to claim 1 wherein said step of separating the produced fluids further comprises separating the mixed oil-water liquid phase from the LPG and non-condensing gas phase in a gas-liquid separation zone, passing the separated liquid phase to a settling zone wherein produced oil is separated from the water, passing said LPG and non-condensing gas phase thru a liquefaction zone, and passing the resulting liquid phase to a high pressure separation zone wherein the non-condensing gas flashes off and is thereby separated from said LPG.

3. A method of recovering oil from an oil-bearing formation having a plurality of wells arranged in substantially regular spaced rows penetrating said formation wherein water is injected into the reservoir via a first input well, said input well being disposed centrally relative to a first group of production wells, continuing the injection of water until the ratio of water to oil produced is uneconomical and there remains unswept sections of the reservoir that extend between the producing wells of said first group, thereafter shutting down said water input well, injecting a bank of a liquefiable petroleum gas into at least one well of said first group of producing wells, maintaining a pressure on said injected petroleum gas sufficient to retain the gas in liquefied form, next injecting a non-condensing gas through said one well of said first group so as to drive said liquefied petroleum gas through said formation toward the remaining producing wells of said first group, then injecting water through said one well to drive said non-condensing gas and the remainder of said liquefied hydrocarbons ahead of it through the reservoir, withdrawing oil, liquefied petroleum gas, and non-condensing gas from said reservoir through said remaining producing wells, separating the produced fluids, reinjecting the separated liquefied petroleum gas into at least one well of a second group of wells, thereafter reinjecting separated non-condensing gas into said one well of a said second group of wells, and withdrawing oil, liquefied petroleum gas, and non-condensing gas through the remaining wells of said second group of wells.

4. A method of recovering oil from an oil-bearing formation having a plurality of wells arranged in substantially regular spaced rows penetrating said formation wherein water is injected into the reservoir via a first input well, said input well being disposed centrally relative to a first group of production wells, continuing the injection of water until the ratio of water to oil produced is uneconomical and there remains unswept sections of the reservoir that extend between the producing wells of said first group, thereafter shutting down said water input well, injecting a bank of a liquefiable petroleum gas into at least one well of said first group of producing wells, maintaining a pressure on said injected petroleum gas sufficient to retain the gas in liquefied form, next injecting a non-condensing gas through said one wells of said first group so as to drive said liquefied petroleum gas through said formation toward the remaining producing wells of said first group, then injecting water to drive said non-condensing gas and the remainder of said liquefied hydrocarbons ahead of it through the reservoir, withdrawing oil, liquefied petroleum gas, and non-condensing gas from said reservoir through said remaining producing wells, separating the produced fluids, reinjecting the separated liquefied petroleum gas into at least one well of a second group of wells, thereafter reinjecting separated non-condensing gas into said one well of a said second group of wells, then reinjecting water through said one well to drive said non-condensing gas and the remainder of said liquefied hydrocarbons ahead of it through the reservoir, and withdrawing oil, liquefied petroleum gas, and non-condensing gas through the remaining wells of said second group of wells.

5. A method of recovering oil from an oil-bearing formation having a plurality of wells arranged in substantially regular spaced rows penetrating said formation, said wells further defining a plurality of 5-spot patterns, each pattern consisting of four corner wells describing a square and a central well equidistant from said corner wells, oil being displaced from said formation by injecting into said 5-spot patterns a driving fluid selected in the following manner:

(a) water is injected into said formation via the first central well of the first of said 5-spot patterns until the ratio of water to oil produced is uneconomical and there remains unswept sections of the formation that extend between the producing corner wells of said first group;

(b) terminating water injected through said first central well;

(c) injecting a bank of liquefiable petroleum gas into said first central well of said first 5-spot pattern;

(d) maintaining a pressure on said injected petroleum gas sufficient to retain said gas in liquefied form;

(e) injecting a non-condensing gas through said first central well of said first 5-spot pattern so as to drive said liquefied petroleum gas through said formation toward the remaining producing wells of said first pattern;

(f) then reinjecting water through said first central well to drive said non-condensing gas and the remainder of said liquefied hydrocarbons ahead of it through the formation;

(g) withdrawing oil, liquefied petroleum gas, and non-condensing gas from said formation through said remaining producing wells;

(h) separating the produced fluids;

(i) reinjecting the separated liquefied petroleum gas into a second central well of a second 5-spot pattern;

(j) thereafter reinjecting separated non-condensing gas into said second central well of said second 5-spot pattern;

(k) then reinjecting water through said second central well to drive said non-condensing gas and the remainder of said liquefied hydrocarbons ahead of it through the formation; and (l) withdrawing oil, liquefied petroleum gas and non-condensing gas through the remaining producing wells of said second 5-spot pattern.

References Cited in the file of this patent

UNITED STATES PATENTS

| | | |
|---|---|---|
| 2,297,832 | Hudson | Oct. 6, 1942 |
| 2,309,075 | Hill | Jan. 19, 1943 |
| 2,742,089 | Morse et al. | Apr. 17, 1956 |
| 2,885,002 | Jenks | May 5, 1959 |
| 2,968,350 | Slobod et al. | Jan. 17, 1961 |